United States Patent [19]
Karellas

[11] Patent Number: 5,519,227
[45] Date of Patent: May 21, 1996

[54] STRUCTURED SCINTILLATION SCREENS

[75] Inventor: Andrew Karellas, Auburn, Mass.

[73] Assignee: The University of Massachusetts Medical Center, Worcester, Mass.

[21] Appl. No.: 287,239

[22] Filed: Aug. 8, 1994

[51] Int. Cl.⁶ .................. G01N 23/083; G01N 21/64; G01T 1/24
[52] U.S. Cl. .................. 250/483.1; 250/370.11; 250/487.1
[58] Field of Search .............. 250/483.1, 370.11, 250/370.09, 487.1

[56] References Cited

U.S. PATENT DOCUMENTS

| | | | |
|---|---|---|---|
| 4,069,355 | 1/1978 | Lubowski et al. | 250/483.1 |
| 4,362,946 | 12/1982 | Cusano et al. | 250/483.1 |
| 4,375,423 | 3/1983 | Cusano et al. | 250/483.1 |
| 4,473,513 | 9/1984 | Cusano et al. | 250/487.1 |
| 5,153,438 | 10/1992 | Kingsley et al. | 250/370.09 |
| 5,241,180 | 8/1993 | Ishaque et al. | 250/483.1 |
| 5,302,423 | 3/1994 | Tran et al. | |
| 5,334,843 | 8/1994 | Zeman | 250/483.1 |
| 5,418,377 | 5/1995 | Tran et al. | 250/487.1 |

Primary Examiner—Constantine Hannaher
Assistant Examiner—Virgil O. Tyler
Attorney, Agent, or Firm—Fish & Richardson

[57] ABSTRACT

A method for fabricating x-ray-detecting structured screens using laser-based micro-machining techniques results in devices having improved spatial resolution. In one case, each pixel of the screen contains an optically active scintillating material surrounded with a optically inactive material having a relatively lower refractive index; following absorption of light, each pixel channels x-ray-induced phosphorescence to a small region of a detector. Alternatively, the optically active material can be a photoconducting material, such as selenium, and the surrounding optically inactive material is chosen to have a relatively high resistivity.

40 Claims, 4 Drawing Sheets

STRUCTURED SCINTILLATION SCREENS

BACKGROUND OF THE INVENTION

This invention relates to structured phosphor screens.

Phosphor screens are used in the field of x-ray detection and imaging to convert high-energy x-ray photons into lower-energy optical photons; for each incident x-ray photon, multiple optical photons are generated. After passing through the phosphor screen, both x-ray and visible photons can then be detected using devices sensitive to electromagnetic radiation, such as an emulsified film or CCD camera.

In general, x-rays propagating through solid materials may be deflected, scattered, or absorbed. In the case of absorption, fluorescent or phosphorescent materials contained in phosphor screens emit photons in response to incident x-rays, yielding a scintillation of light in the ultraviolet (UV), visible, or infrared (IR) spectral range. In a particular example, calcium tungstate, a frequently used phosphorescent material, emits multiple photons in the spectral region of 400–500 nm following absorption of a single x-ray photon having an energy of about 35 KeV; in this case, 1000 initial x-ray photons result in the generation of about 180,000 optical photons (*Physics of Radiology*, A. B. Wolbarst, p. 184, 1993). The emission process, therefore, effectively amplifies the number of photons available for detection, thereby allowing high-contrast images to be produced.

In medical imaging applications, phosphor screens may be incorporated into radiographic cassettes, where they are used to expose a sheet of emulsified film. Typically, the phosphorescent material is polycrystalline in form and embedded in a binder; individual crystals of the phosphorescent material are usually on the order of 10 μm in diameter. Following assembly, the radiographic cassette is positioned relative to a patient and x-ray source in order to detect x-rays passing through a plane of a target volume (such as a region of tumorous tissue) in the patient. To expose the film, an incident x-ray photon is absorbed by the phosphor screen, resulting in the emission of a series of lower-energy photons; through this process, the details of the target volume are imaged onto the film.

Alternatively, electronic detection devices, such as CCD cameras or diode arrays, can be placed behind the exposed phosphor screen to allow for detection of the emitted photons. Such equipment can be used to provide real-time imaging of objects in rapid motion, such as the heart.

In all cases, it is desirable to reduce the patient's risk of x-ray exposure during imaging procedures. One approach to minimize the amount of x-ray radiation required to produce a given image is to increase the amount of photon amplification (i.e., the degree of conversion of x-rays to optical photons) produced by the phosphor screen. This can be done using a number of methods: screens can be made thick (e.g., between 150 μm and 1 mm) to increase the probability that incident x-ray photons are absorbed by the fluorescent or phosphorescent materials; alternatively, the density of such materials in the screen can be increased to improve the probability that x-ray absorption occurs.

While both of these methods increase the degree of photon amplification produced by the phosphor screen, the resolution, or sharpness of the resultant image, typically decreases correspondingly. Optical photons emitted following x-ray absorption propagate outwardly and randomly in all directions. Spatial dispersion of the emitted optical field, as well as diffusion and scattering off of neighboring crystalline material in the phosphor screen, enlarges the area of the film (or detector) that is illuminated, resulting in a blurring of the resultant image. Additionally, the intensity of the emitted light decreases as it propagates away from the point of x-ray absorption, resulting in a further decline of image quality.

In summary, there exists a reciprocal relationship between the degree of amplification and resolution provided by the phosphor screen. Thicker screens provide increased sensitivity and decreased resolution for a given x-ray level. Thinner screens result in a sharper x-ray image, but require more x-ray photons to produce the image, resulting in an increase in the x-ray dosage to which the patient is exposed.

One technique used to fabricate high-resolution phosphor screens which provide suitable x-ray sensitivity involves segmenting the phosphor screen into a two-dimensional array of pixels. Following x-ray absorption, this design allows each pixel to channel emitted radiation to the light-sensitive detector. If the pixels are optically isolated, spatial dispersion and scattering effects which normally blur the x-ray-induced image are reduced. Ito et al., IEEE Trans. Nuc. Sci. Vol. 34, p. 401, describe a two-dimensional phosphor screen which consists of individual CsI(Na) crystals grown on glass fibers etched onto a glass plate. In U.S. Pat. No. 5,302,423, a method for fabricating pixelized phosphors using optical ablation techniques is described.

SUMMARY OF THE INVENTION

We have discovered that optical processing techniques (primarily those involving laser micro-machining) can be used to ablate regions of a transparent or semi-transparent scintillating substrate, thereby forming individual pixels. By surrounding each pixel with an optically inactive material having a relatively lower refractive index, each pixel can be made to function as an optical waveguide, such as an optical fiber. The surrounding optically inactive material functions as a "cladding" for each fiber in the substrate; choosing the appropriate cladding allows x-ray-induced phosphorescence to be confined to individual pixels and ultimately channeled to a detector, such as an emulsified film or CCD. Small areas of a detector are illuminated by each pixel of the screen, resulting in increases in spatial resolution and detection efficiency. In addition, structured scintillators made in accordance with the invention can be fabricated to be several millimeters thick, thereby increasing the x-ray absorption cross section. This results in an increase in sensitivity and spatial resolution, while minimizing the x-ray exposure of the patient and detector.

Accordingly, in one aspect, the invention provides a process for making a structured scintillator for detecting x-rays which includes the steps of: a) providing a scintillation substrate consisting essentially of an optically transparent or semi-transparent material; b) exposing regions of the scintillating substrate to an electromagnetic radiation pattern which substantially removes the substrate in the exposed regions to form an array of pixel structures; and, c) loading in regions between the pixel structures a second, optically inactive interstitial material having a lower refractive index than the scintillation substrate. The interstitial material provides a cladding for the transparent or semi-transparent pixel, allowing it to essentially function as an optical waveguide. This material, therefore, substantially surrounds each pixel structure such that following emission of radiation (which may be in the visible, IR, or UV spectral regions) in response to absorbed x-ray radiation, the pixel structure internally reflects the emitted radiation. Each pixel confines and guides the emitted radiation, thereby decreasing the detector area illuminated by a single pixel structure, and increasing the resolution of the structured scintillator.

In preferred embodiments, the source of the electromagnetic radiation pattern is a laser, most preferably an excimer laser. The electromagnetic radiation pattern results in ablation of the exposed regions of the scintillating substrate, resulting in the formation of the pixel structures. Alternatively, the laser is used to first illuminate a mask to form the electromagnetic radiation pattern; the resulting pattern is then used to ablate the scintillating substrate to form the pixel structures.

In other aspects of the invention, structured scintillators, such as those fabricated by the above-identified method, are provided. These devices preferably have pixel diameters between 0.5 μm and 2.0 mm; in especially preferred embodiments, the pixel diameter is between 1 and 100 μm. In some embodiments, the array of pixel structures contained in the screens extend in two dimensions. The cross sections of the pixel structures may be arbitrarily shaped, or, preferably, substantially circular or square. In alternate embodiments, the array contains pixel structures having tapered or dome-shaped ends for focusing the emitted radiation. Once formed, neighboring pixel structures are preferably separated by a distance of between 0.2 and 50.0 microns, inclusive, and most preferably by a distance of about 0.5 microns.

In preferred embodiments, the optically transparent or semi-transparent scintillating material is selected from the group including glass-based scintillating materials, $CdWO_4$, thallium-activated sodium iodide (i.e., NaI(Tl)), terbium-doped glass scintillators, transparent plastic scintillators, ceramic-based scintillating materials, including $Gd_2O_3$, $Gd_2O_2S$:Pr,Ce,X, where X is F or Cl, $Gd_2O_2S$:Pr, $Y_2O_3$/$Gd_2O_3$, and related ceramic-based materials described in U.S. Pat. Nos. 4,747,973, 4,518,546, 4,473,513, and 4,525,628, the contents of which are incorporated herein by reference. In particularly preferred embodiments, the optically transparent or semi-transparent material is $CdWO_4$. In other embodiments, the scintillating material is a single-crystalline material.

In additionally preferred embodiments, the step used to provide the interstitial material consists of a thin-film deposition technique, preferably a vapor deposition technique. Interstitial materials which can be incorporated into the structured scintillator include optical glasses, which may be doped with a variety of materials (including heavy metal oxide compounds, such as $P_2O_5$) to lower their refractive indices, polymeric materials (e.g., transparent polyimide and polymethacrylate), epoxy (e.g., UV-curable epoxies), carbon-based films, and air. In particularly preferred embodiments, the interstitial material is a polymer, preferably polyimide.

In other embodiments of the invention, the structured scintillator further comprises a detection device, selected from the group including exposable films, and electronic detectors such as CCD cameras, photodiode arrays, charge-injection devices, amorphous silicon detectors, position-sensitive detectors, photomultiplier tubes, and image intensifiers. Most preferably, the detection device is an exposable film or a CCD.

In another aspect of the invention, the invention provides a structured apparatus for detecting x-rays which contains a pixelized photoconductive substrate. Preferably, the photoconductive substrate is composed of a selenium or selenium-based material. In preferred embodiments of this aspect of the invention, neighboring pixel structures in the substrate are separated by a distance of between 0.2 and 50.0 microns; preferably, the separation distance is about 0.5 microns.

Certain terms used in the following description are now defined herein. By "optically active" is meant a material that emits optical radiation or electrons following absorption of x-rays. Accordingly, "optically inactive" materials may absorb and reflect light, but are not emissive or photoconductive. Additionally, by "semi-transparent" is meant a material which is not highly translucent or opaque, and does not significantly absorb, scatter, or distort the optical radiation, i.e., radiation in the visible, infrared, or ultraviolet spectral regions.

By "substantially square" and "substantially circular" is meant shapes similar to, but not necessarily identical to, squares and circles (e.g., ellipses, rectangles, or related shapes which are distorted).

DESCRIPTION OF THE PREFERRED EMBODIMENTS

Figure 1A:
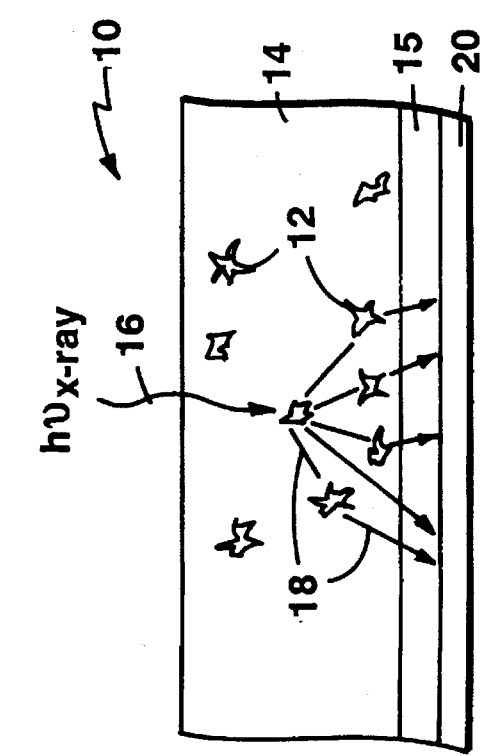
FIG. 1A is a cut-away side view of a single pixel of the structured scintillator of the invention.
Figure 1B:
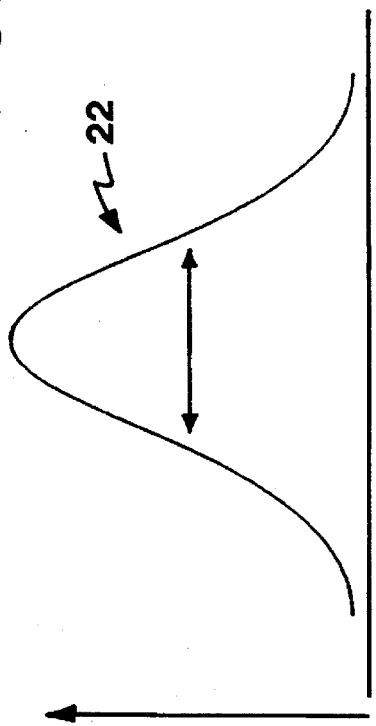
FIG 1B is a schematic showing the spatial intensity profile of the optical field resulting from the single pixel of FIG. 1A.
Figure 1C:
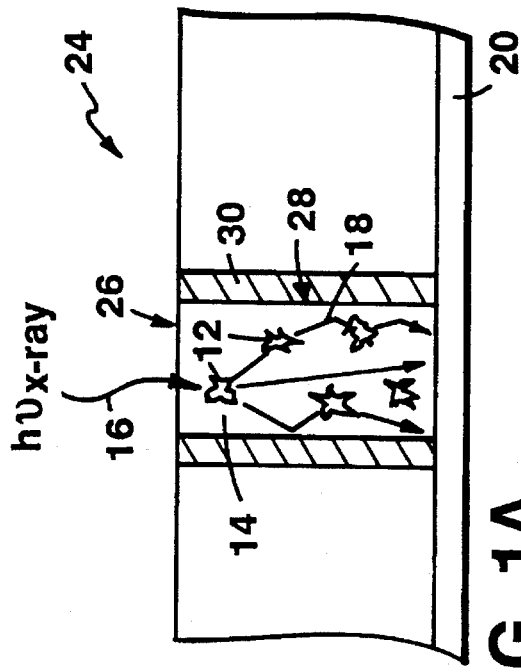
FIG. 1C is a cut-away side view of a structured scintillator of the prior art.
Figure 1D:
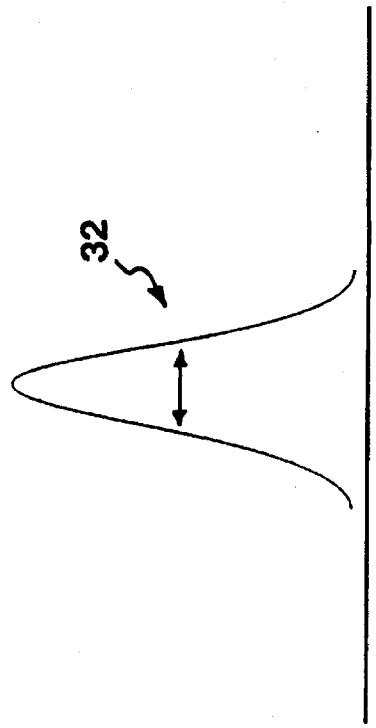
FIG. 1D is a schematic showing the spatial intensity profile of the optical field resulting from the structured scintillator of FIG. 1C.

Referring first to FIGS. 1C and 1D, a phosphor screen 10 of the prior art includes small volumes of phosphorescent regions 12 dispersed throughout a host material 14, which is typically a binder material attached to the substrate 15 and used to support the optically active regions. Incident x-ray photons 16, typically having energies of between 1 Kev and 1 MeV, may be absorbed by the phosphorescent regions 12, resulting in the generation of multiple optical photons 18. Alternatively, x-rays may pass through the host material 14 unattenuated. In the absence of a confining mechanism, emitted photons propagate randomly in all directions, and are free to scatter off other phosphorescent regions 12, or other particulate in the binder 14, until they pass through the substrate 15 and are detected by a detection layer 20, which may be a film layer or CCD camera. Scattering and dispersing results in a broadening of the spatial intensity profile 22 measured in the detecting layer 20, resulting in a decrease in spatial resolution of the structured scintillator.

Referring now to FIGS. 1A and 1B, in order to achieve higher spatial resolution, the present invention includes a structured scintillator 24 containing a pixel 26 which allows for confinement of the emitted optical field. Following absorption of an incident x-ray photon 16, optical photons 18 are emitted from phosphorescing regions 12. If the refractive index of the interstitial material 30 ($n_i$) is chosen to be lower than that of the host material 14 ($n_h$), optical photons 18 incident on the interface region 28 separating the host material 14 from the interstitial material 30 will be internally reflected in the pixel 26, resulting in containment of the photons 18. In this approach, the fraction of light (F) which escapes from one end of the fiber optic pixel is estimated by the formula:

$$F=0.5(1-n_i/n_h)$$

When compared to the phosphor screen of the prior art, the present invention allows a narrow spatial intensity profile 32 to be detected by the detecting layer 20, thereby increasing the resolution of the structured scintillator while minimizing cross talk between neighboring pixels.

Structured Scintillator Fabrication

In order to achieve a high-resolution image, the structured scintillator contains an array of closely-spaced pixels, each containing a phosphorescent material; individual pixels are surrounded on all sides by an interstitial material having a lower refractive index. In each design, each pixel is constructed to provide optical properties similar to those of optical waveguide structures (e.g., optical fibers). The resolution of the structured scintillator (and the corresponding detected image), therefore, is ultimately determined by the diameter of the individual pixels.

In one aspect, in order to fabricate pixels having small diameters, the optically-active substrate may be "micromachined" by exposing the substrate to electromagnetic radiation, thereby ablating the substrate in the exposed regions to create a one or two-dimensional array of pixels.

In preferred embodiments of the invention, the source of the ablating electromagnetic radiation is a laser, preferably an excimer laser, Nd:YAG or Nd:YLF laser (the fundamental or second harmonic frequencies may be used), $CO_2$ laser, or Ti:sapphire laser. In particularly preferred embodiments, an excimer laser having an optical output centered in the ultra-violet region (i.e., $\lambda$=190–260 nm) of the spectrum, is used as the light source.

In order to increase the peak optical power of the light source, laser pulses (as opposed to continuous wave radiation) may be used to illuminate the substrate. For example, by electro-optically or acousto-optically modulating the light source, the optical output can be made to take the form of a pulse; the repetition rate and duration of the pulse are determined by the modulating device and bandwidth of the light source. Typically, pulse durations of between 100 ps and 50 ns, and repetition rates of between 10 Hz and 10 kHz, can be easily achieved. For lasers of this type, each pulse is used to ablate a small amount of the substrate. Additionally, the spot size and spatial mode quality of the laser beam after focussing will influence its ablating properties. Preferably, the spatial mode of the focussed beam is gaussian or nearly gaussian (i.e., the $TEM_{00}$ mode) and the spot size is diffraction limited, lying between 0.5 and 100 μm. In general, the light source used for ablation is centered at a wavelength which is strongly absorbed by the substrate, has a pulse duration of between about 20–45 ns, with a corresponding energy of between 20–50 μJ/pulse.

In addition, masking techniques well known in the art can be used to tailor the ablating electromagnetic radiation pattern, thereby allowing precision micro-machining of the optically active substrate. In particular embodiments, a mask (fabricated, e.g., of a reflecting material such as aluminum or gold) is placed in direct contact with the substrate to be ablated; the pattern of the mask is then mapped onto the incident laser beam, allowing a particular pattern to be ablated onto the substrate. Alternatively, a projection mask may be used in combination with the incident optical beam. In this embodiment, the mask is spatially separated from the substrate; the pattern of the mask is then mapped onto an incident optical field, which can then be focussed or expanded and used to ablate the substrate in the desired pattern.

Pixelized structures having well-defined spatial geometries and depths can be fabricated in a controlled manner with such techniques. For example, pixels having square, circular, or elliptical cross sections can be micro-machined using masking techniques known in the art. FIG. 2B shows a pixel having a square cross section. Preferably, the diameter of the pixel formed is larger than the wavelength of the radiation emitted from the optically active material contained within the pixel. This allows each pixel to achieve total internal reflection of the emitted field, thereby resulting in a more efficient optical waveguide. In addition, the shape of the tips of each pixel can be controlled using optical-based micro-machining techniques. Pixels having tapered or dome-shaped ends allow focussing of the emitted phosphorescence, and can be fabricated to further increase the spatial resolution of the structured scintillator. The depth of etching, corresponding to the "length" of each pixel, is controlled by adjusting the number and energy of laser pulses used to ablate the substrate. In embodiments, pixels having depths extending 80%–90% into the thickness of the substrate (typically on the order of 1–5 mm) are preferred.

Following laser processing of the substrate, the pixels are surrounded with an optically inactive interstitial material which performs a function similar to the cladding surrounding an optical fiber. Interstitial materials are chosen to have lower relative refractive indices compared to the optically active substrate. This allows each pixel to function as an individual optic waveguide, i.e., optical leakage and crosstalk between neighboring fibers is avoided, and the spatial geometry of the emitted optical field is confined to each pixel. Interstitial materials may be deposited to surround the pixels using deposition or sputtering techniques known in the art. Alternatively, the cladding materials may be initially liquid-based, i.e., in the form of an epoxy; application using conventional techniques, followed by curing of the epoxy, allows the cladding to adhere to each pixel in the array. In this embodiment, a vacuum may be applied to the liquid-based epoxy during curing to limit the amount of air bubbles in interstitial material. In other alternate embodiments, a second optically inactive material, preferably one having a high absorption coefficient for visible light, can be used to further surround the cladding material. The purpose of this layer is to absorb scattered light, such as light coupled out of a particular pixel or reflected by the detection device, thereby allowing a reduction in optical-based noise during an imaging procedure.

Materials

Figure 2A:
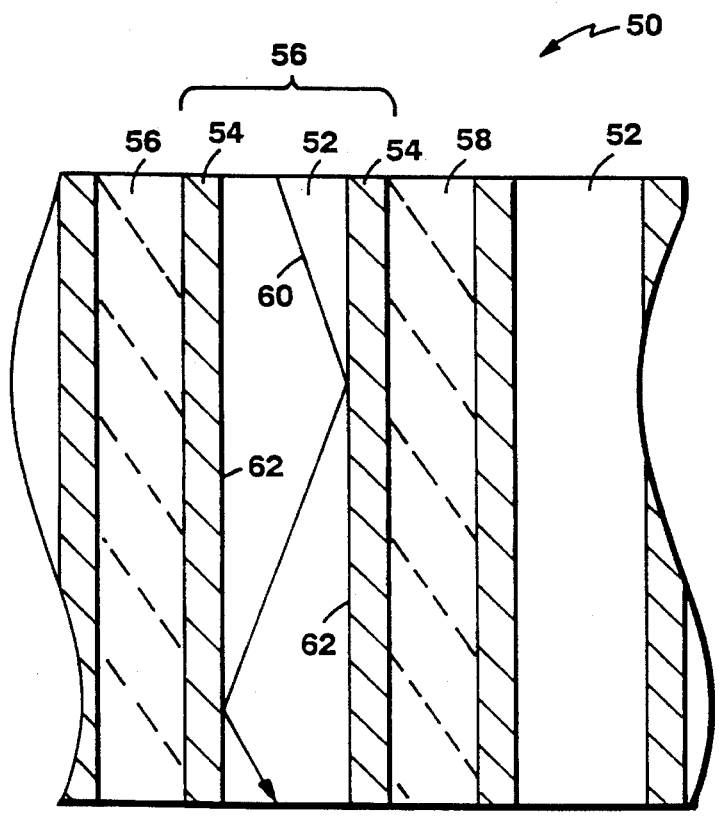
FIG. 2A is a cut-away side view of a pixel of a structured scintillator in accordance with a preferred embodiment of the invention.
Figure 2B:
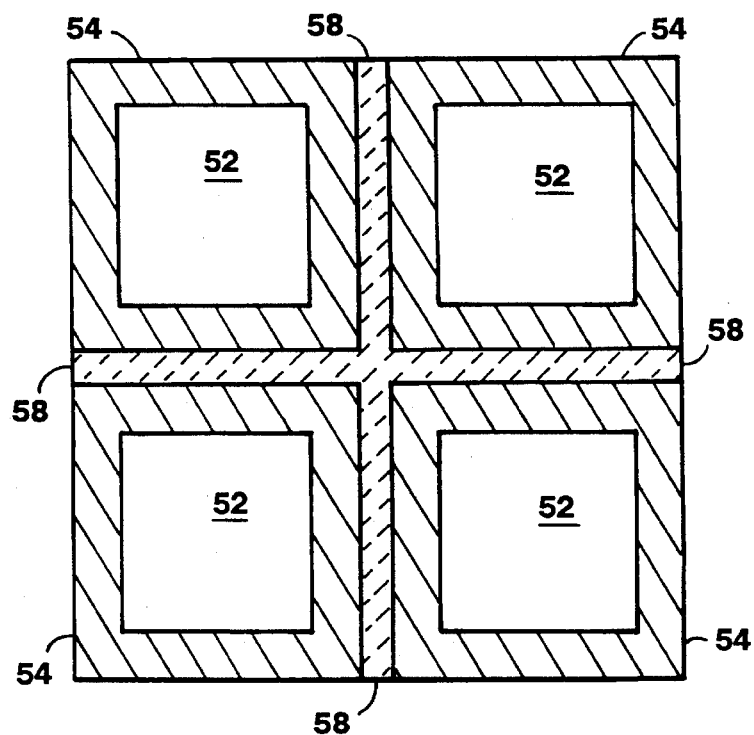
FIG. 2B is a cross-sectional view of a pixel from the structured scintillator shown in FIG. 2A.

Referring now to FIG. 2, a structured scintillator 50 made in accordance with the present invention contains a pixel 52 composed primarily of an optically active scintillating material. Each pixel 52 is surrounded by interstitial material 54 to form an optical waveguide 56 within the structured scintillator 50; neighboring optical waveguides 56 are separated with an optically inactive, highly absorbing layer 58.

During operation, photons 60 emitted from the scintillating material are internally reflected at the pixel/cladding interface 62, resulting in confinement of the photons to their pixel of origin. Light emitted from each x-ray-excited pixel will illuminate the detector; the collective illumination by the structured scintillator 50 results in image formation.

The substrate forming the structured scintillator is composed of scintillating materials which are optically transparent or semi-transparent to visible frequencies. Such materials include glass-based scintillating materials, $CdWO_4$, thallium-activated sodium iodide (i.e., NaI(Tl)), terbium-doped glass scintillators, transparent plastic scintillators, ceramic-based scintillating materials, including $Gd_2O_3$, $Gd_2O_2S:Pr,Ce,X$, where X is F or Cl, $Gd_2O_2S:Pr$, $Y_2O_3$/$Gd_2O_3$, and related ceramic-based materials. In particularly preferred embodiments, the optically transparent or semi-transparent material is $CdWO_4$. In other embodiments, the scintillating material is a single-crystalline material. The refractive indices of these materials vary from about 1.4 (glass-based scintillators) to about 1.8. Preferably, the substrate is a single-crystalline scintillating material, such as $CdWO_4$, resulting in pixel structures having a necessarily high level of optically activity. For glass or ceramic-based substrates, which are isotropic materials containing local domains of scintillating material, the density of optically active material in the substrate will vary depending on the particular application. For example, for applications involving low x-ray levels, the density of the optically active material can be increased.

Interstitial materials forming the cladding must be optically inactive, easily formable, and have a relatively low refractive index (at visible frequencies) compared to the transparent or semi-transparent scintillating material. Such materials include high and low index glasses, which can be doped to vary the refractive index, transparent polymeric materials including polyimide, polymethacrylate and UV-curable epoxies. Similarly, the optically inactive, highly absorbing material which surrounds the cladding in certain embodiments may be a polymer or a glass; these materials may additionally be doped to enhance their absorption cross section.

In addition, it is desired, but no required, that the materials used in the phosphor resist degradation or decomposition when exposed to x-ray radiation.

The detector used in combination with the structured scintillator is chosen depending on the particular imaging application. For example, electronic detection means are necessary for time-dependent imaging; CCD cameras, one or two-dimensional diode arrays, charge injection devices, amorphous silicon detectors, position-sensitive detectors, photomultiplier tubes and image intensifiers can produce high-resolution digital images when used in combination with the structured scintillator of the present invention. These devices, along with light-sensitive film, may be used with the structured scintillator to produce static images.

Structured Scintillators

Figure 3A:
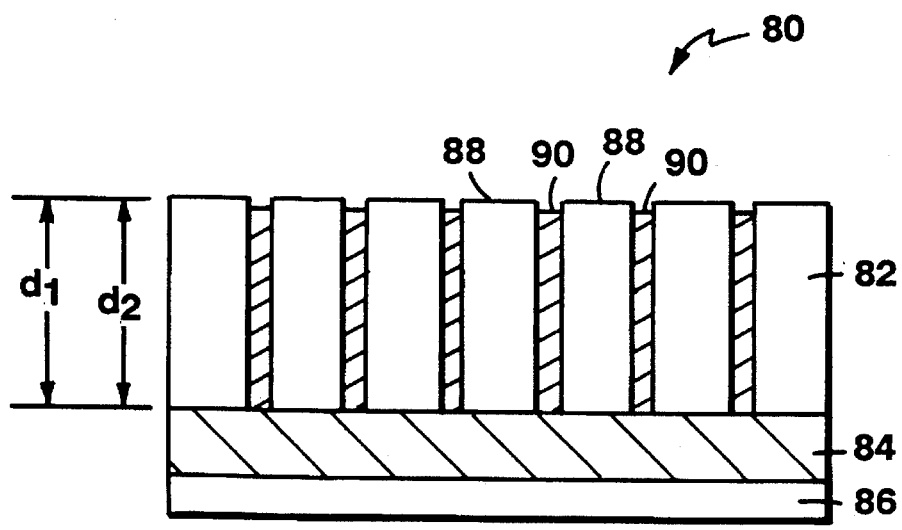
FIG. 3A is a cut-away side view of a structured scintillator in accordance with a preferred embodiment of the invention.

Referring now to FIG. 3A, in yet another preferred embodiment of the invention, a cut-away side view of a structured scintillator 70 made in accordance with the invention contains a transparent or semi-transparent scintillating substrate 72 containing individual pixels 74 formed using laser-based micro-machining techniques. An optically inactive, interstitial material 76 forming the cladding is positioned to surround each pixel 74 in order to allow total internal reflection to occur at the pixel/cladding interface 75, thereby producing a high-resolution image at the detector 78. In the illustrated embodiment, the depth $d_1$ of each pixel extends roughly 80% of the way into the depth $d_2$ of the substrate. The cladding is roughly the same height as the pixels. In alternate embodiments, structured scintillators made in accordance with the invention may be stacked on top of each other to provide a higher x-ray absorption cross section. This increases the sensitivity of the detector, and minimizes the detector's exposure to potentially damaging x-ray radiation.

Figure 3B:
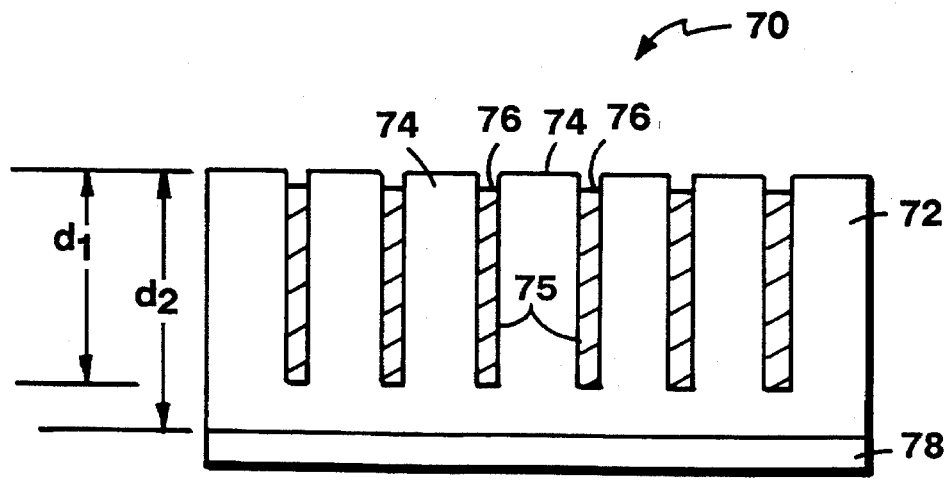
FIG. 3B is a cut-away side view of a structured scintillator in accordance with an alternate embodiment of the invention.

Referring now to FIG. 3B, in an alternate embodiment of the invention a structured scintillator 80 includes an optically transparent or semi-transparent substrate 82 deposited onto a secondary support 84, which is also transparent or semi-transparent to visible frequencies, and is composed of a material similar to that used as the interstitial material, such as glass or ceramic-based materials, thin metal films, polymeric materials, and related materials. In preferred embodiments, the secondary support 84 is a optically transparent glass or ceramic plate fabricated to exhibit optical waveguide properties, such as a substrate containing an array of optical fibers or a fiber optic bundle. This substrate may be used to mechanically support the structured scintillator during imaging applications, while simultaneously coupling light to the detector. For example, a glass secondary support containing a two-dimensional array of optical fibers and having a thickness of about 10 μm can be coupled directly to a CCD. Additionally, the substrate can be used to further absorb, scatter or deflect x-rays passing through the scintillator, thereby filtering this harmful radiation from the optical detector. In other applications, the thickness of the fiber-containing plate can be increased up to a few millimeters; the substrate may provide other optical functions, such as focussing light on the detector. In all embodiments, the secondary substrate is chosen to have a low absorption coefficient for the radiation emitted from the scintillator.

Referring again to FIG. 3B, the substrate 82 is deposited on the secondary support 84 by any suitable method, including vacuum evaporation, sputtering techniques, spraying or painting, or other related techniques. Once deposited, individual pixels 88 are formed using laser-based micro-machining techniques to ablate the substrate 82 to the extent that the secondary support 84 is exposed. Following this process, an interstitial material 90 is provided as described herein to form the cladding. In this embodiment, it is necessary to keep the secondary support 84 thin, preferably between 500 μm and 1 mm, to avoid spatial dispersion of the x-ray-stimulated optical field at the detector 86.

Figure 4:
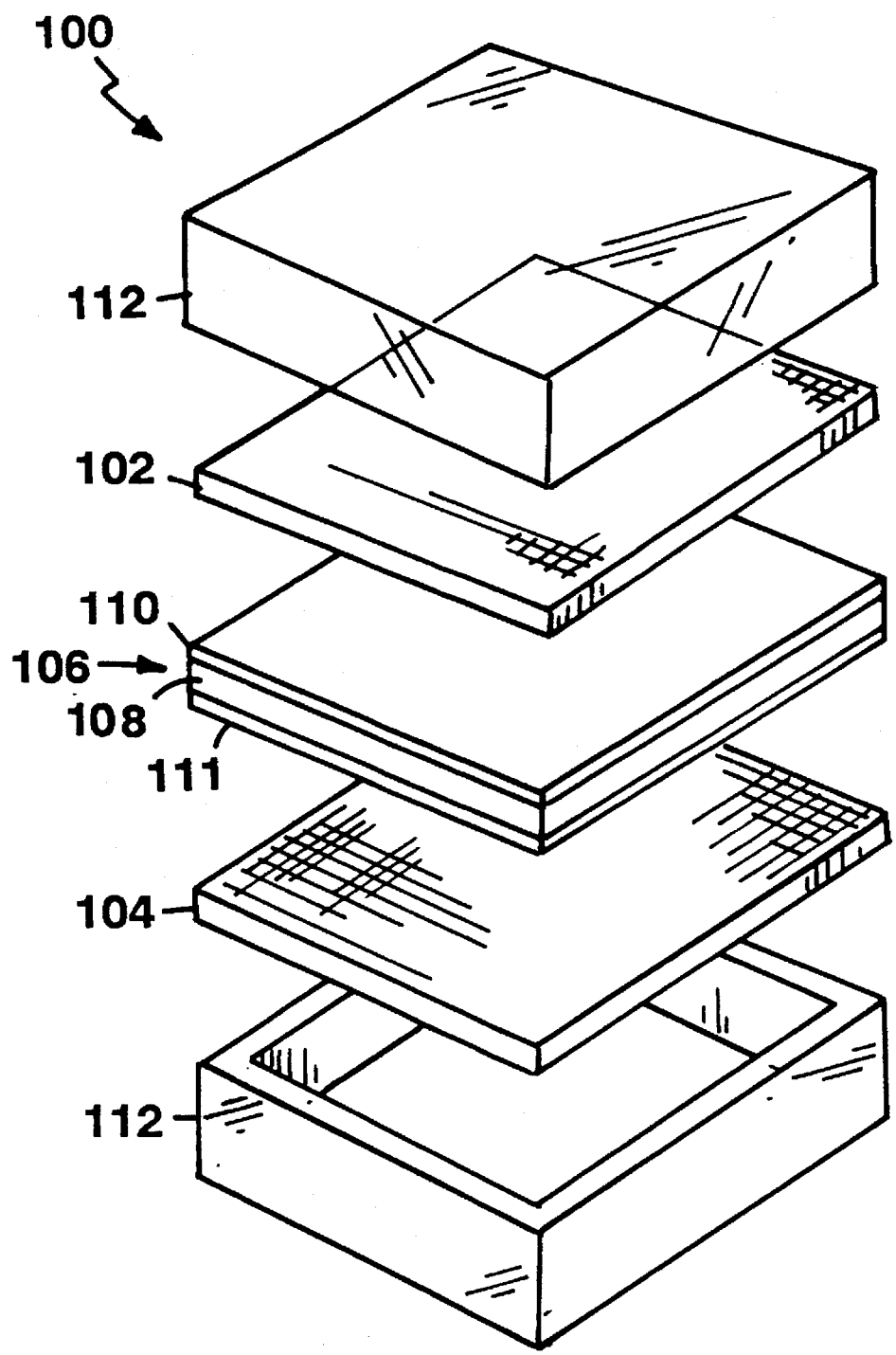
FIG. 4 is an exploded view of an x-ray detecting device in accordance with a preferred embodiment of the invention.

Referring now to FIG. 4, in an embodiment of the invention an x-ray imaging device 100 includes two structured scintillators 102, 104 made in accordance with the method of the present invention. The structured scintillators 102, 104 sandwich an exposable film layer 106 which includes a film base 108 and film emulsions 110, 111 adhered to the top and bottom surfaces of the base 108. A metal case 112, transparent to x-ray radiation, provides a light-tight seal for the x-ray imaging device 100. During operation, an x-ray photon passes first through the region to be imaged, and then propagates through the metal case 112. Once inside the imaging device 100, the x-ray photon may interact with one of the two structured scintillators 102, 104. For example, an x-ray photon which first passes through the top section of the metal case 112 may be absorbed by the first structured scintillator 102; in this case, the emitted photons will expose the adjacent film emulsion 110. If the x-ray photon passes through the first structured scintillator 102, it may expose the film emulsions 110, 111 directly, or pass through these layers to be absorbed by the second structured scintillator 104. In this event, the emitted photons expose the adjacent film emulsion 111. Once developed, the exposable film layer contains the image of the irradiated region.

Other Embodiments

In other alternate embodiments, the optically active material processed in accordance with the invention may be composed of a photoconductive material, such as selenium or a selenium-doped material, capable of converting incident x-rays directly into electrical signals. When biased with high electrical fields, charges are trapped at the surface of the photoconductive substrate. Incident x-ray fields liberate the trapped charges, resulting in an electrical signal which is proportional to the magnitude of the x-ray field (Zermeno et al., SPIE Vol. 173, *Application of Optical Instrumentation in Medicine VII*, p. 81 (1979)). The electrical signal can be detected and amplified using conventional means, and then processed to generate an image.

In this aspect of the invention, individual pixels in the photoconductive substrate are formed using the laser micromachining techniques described herein. Each pixel is then surrounded with high-resistivity materials to form, in essence, a photoconducting wire which allows liberated electrons to be channeled to a small area on the opposing surface in contact with, or near to, the charge-sensitive device.

In such embodiments, electronic charge channeled to the pixel surface can be detected using conventional means, such as an electrometer probe separated from the selenium surface. The resultant series of signals can be processed using standard techniques to form an image. Alternatively, the charge distribution on the photoconductor surface can be processed using standard charge transfer and output circuits, and then processed to form an image.

The presence of individual pixels on the photoconductor surface, each surrounded by an insulating layer, prevents x-ray stimulation of too large an area on the photoconductor surface, thus increasing the resolution and contrast of the image.

In preferred embodiments, a selenium layer having a thickness of between 10 μm and 4 mm is used as the substrate. Preferably, single-crystalline selenium substrates are used for the optically active material. Alternatively, the selenium can be vapor-deposited on a secondary substrate. In order to completely absorb the incident x-ray field, the film thickness is preferably between 500 μm and 1 mm. In preferred embodiments, pixel diameters are between 0.5 μm and 2.0 mm; in especially preferred embodiments, the pixel diameter is between 1 and 100 μm. Most preferably, the array of pixel structures contained in the screens extend in two dimensions. The cross sections of the pixel structures may be arbitrarily shaped, or, preferably, substantially circular or square.

In preferred embodiments of this aspect of the invention, a high-resistivity material is deposited in the laser-machined (i.e., ablated) regions using a vapor deposition method. Preferably, the high-resistivity material is a standard insulating material, such as a non-conducting glass or polymer. Other dielectric materials which may be used include non-conducting ceramic materials, epoxies and carbon-based films.

The foregoing descriptions of the preferred embodiments of the invention have been presented for purposes of illustration and description. They are not intended to be exhaustive or to limit the invention to the precise form disclosed. The embodiments are chosen in order to best explain the principles of the invention.

What is claimed is:

1. A process for making a structured scintillator for detecting x-rays comprising the steps of:

providing a scintillation substrate comprising a scintillating material, exposing regions of said scintillating substrate to an electromagnetic radiation pattern, thereby substantially removing portions of said substrate in said exposed regions to form an array of pixel structures, and loading between said pixel structures a transparent, optically inactive interstitial material having a lower refractive index than said scintillation substrate, said interstitial material substantially surrounding said pixel structures such that following emission of radiation in response to x-ray radiation, said pixel structures internally reflect said radiation, thereby decreasing the area illuminated by a single pixel structure and increasing the resolution of said structured scintillator.

2. The process of claim 1, further comprising the step of using a laser to generate said electromagnetic radiation pattern.

3. The process of claim 2, wherein said laser is an excimer laser.

4. The process of claim 2, wherein said electromagnetic radiation pattern results in ablation of said portions of said scintillating substrate to form said array of pixel structures.

5. The process of claim 2, wherein said laser first illuminates a mask to form said electromagnetic radiation pattern.

6. The process of claim 5, wherein said electromagnetic radiation pattern results in ablation of said portions of said scintillating substrate to form said array of pixel structures.

7. The process of claim 1, wherein said array of pixel structures extends in two dimensions.

8. The process of claim 2, wherein the cross sections of said pixel structures are arbitrarily shaped.

9. The process of claim 8, wherein said cross sections are substantially circular in shape.

10. The process of claim 8, wherein said cross sections are substantially square in shape.

11. The process of claim 1, wherein said array of pixel structures comprises a pixel structure having tapered ends for focussing said radiation.

12. The process of claim 1, wherein neighboring pixel structures are separated by a distance of between 0.2 and 50.0 microns, inclusive.

13. The process of claim 12, wherein neighboring pixel structures are separated by a distance of about 0.5 microns.

14. The process of claim 1, wherein said scintillating material is selected from the group consisting of glass-based scintillating materials, $CdWO_4$, thallium-activated sodium iodide, terbium-doped glass scintillators, transparent plastic scintillators, ceramic-based scintillating materials, $Gd_2O_3$, $Gd_2O_2S:Pr,Ce,Cl$, $Gd_2O_2S:Pr,Ce,F$, $Gd_2O_2S:Pr$, and $Y_2O_3/Gd_2O_3$.

15. The process of claim 14, wherein said scintillating material is $CdWO_4$.

16. The process of claim 1, wherein said scintillating material is a single-crystalline material.

17. The process of claim 1, wherein said loading step consists of a thin-film deposition technique.

18. The process of claim 17, wherein said thin-film deposition technique is a vapor deposition technique.

19. The process of claim 1, wherein said transparent interstitial material comprises a material selected from the group consisting of optical glasses and polymeric materials.

20. The process of claim 19, wherein said transparent interstitial material is a polymeric material.

21. The process of claim 20, wherein said polymeric material is polyimide.

22. A structured scintillator made by the process of claim 1.

23. A structured scintillator for detecting x-rays comprising:
- a scintillation substrate comprising an array of pixel structures, each of said pixel structures comprising scintillating material throughout the entire pixel and having a diameter or width of between 0.5 and 100 μm, and
- a transparent optically inactive interstitial material disposed between said pixel structures, said interstitial material having a lower refractive index than said scintillation substrate and substantially surrounding said pixel structures such that following emission of radiation in response to x-ray radiation, said pixel structures internally reflect said emitted radiation, thereby decreasing the area illuminated by a single pixel structure and increasing the resolution of said structured scintillator.

24. The structured scintillator of claim 23, wherein the cross sections of said pixel structures are arbitrarily shaped.

25. The structured scintillator of claim 24, wherein said cross sections are substantially circular in shape.

26. The structured scintillator of claim 23, wherein said array of pixel structures comprises a pixel structure having tapered ends for focussing said radiation.

27. The structured scintillator of claim 23, wherein neighboring pixel structures are separated by a distance of between 0.2 and 50.0 microns, inclusive.

28. The structured scintillator of claim 27, wherein neighboring pixel structures are separated by a distance of about 0.5 microns.

29. The structured scintillator of claim 23, wherein said scintillating material is selected from the group consisting of glass-based scintillating materials, $CdWO_4$, thallium-activated sodium iodide, terbium-doped glass scintillators, transparent plastic scintillators, ceramic-based scintillating materials, $Gd_2O_3$, $Gd_2O_2S:Pr,Ce,Cl$, $Gd_2O_2S:Pr,Ce,F$, $Gd_2O_2S:Pr$, and $Y_2O_3/Gd_2O_3$.

30. The structured scintillator of claim 29, wherein said scintillating material is $CdWO_4$.

31. The structured scintillator of claim 29, wherein said optically transparent or semi-transparent material is a single-crystalline material.

32. The structured scintillator of claim 23, wherein said transparent interstitial material comprises a material selected from the group consisting of optical glasses, and polymeric materials.

33. The structured scintillator of claim 32, wherein said transparent interstitial material is a polymeric material.

34. The structured scintillator of claim 33, wherein said polymeric material is polyimide.

35. The structured scintillator of claim 23, further comprising a highly absorbing material proximal to said interstitial material.

36. The structured scintillator of claim 23, wherein said highly absorbing material is a doped material.

37. The structured scintillator of claim 23, further comprising a detection device.

38. The structured scintillator of claim 37, wherein said detection device is a light-sensitive film.

39. The structured scintillator of claim 37, wherein said detection device is an electronic detector.

40. The structured scintillator of claim 39, wherein said electronic detector is a CCD.

\* \* \* \* \*